US00RE49383E

(19) United States
(12) Reissued Patent
Walsh et al.

(10) Patent Number: US RE49,383 E
(45) Date of Reissued Patent: Jan. 24, 2023

(54) EXTERNAL THERMOSTAT FAN CONTROLLER

(71) Applicants: John Walsh, Bozeman, MT (US); Robert Mowris, Olympic Valley, CA (US)

(72) Inventors: John Walsh, Bozeman, MT (US); Robert Mowris, Olympic Valley, CA (US)

(21) Appl. No.: 17/351,012

(22) Filed: Jun. 17, 2021

Related U.S. Patent Documents

Reissue of:
(64) Patent No.: 8,763,920
Issued: Jul. 1, 2014
Appl. No.: 13/085,119
Filed: Apr. 12, 2011

U.S. Applications:
(60) Provisional application No. 61/324,229, filed on Apr. 14, 2010.

(51) Int. Cl.
*G05D 23/00* (2006.01)
*G05D 23/19* (2006.01)
*F24F 1/22* (2011.01)
*F24F 11/70* (2018.01)

(52) U.S. Cl.
CPC ..... *F24F 1/22* (2013.01); *F24F 11/70* (2018.01)

(58) Field of Classification Search
CPC ..... F24F 1/22; F24F 11/70
See application file for complete search history.

(56) References Cited

U.S. PATENT DOCUMENTS

| | | | | |
|---|---|---|---|---|
| 4,493,194 | A * | 1/1985 | Briccetti | 62/180 |
| 5,228,307 | A * | 7/1993 | Koce | 62/186 |
| 8,362,725 | B2 * | 1/2013 | Becerra et al. | 318/400.09 |
| 2003/0223172 | A1 * | 12/2003 | Priest | 361/103 |
| 2010/0187318 | A1 * | 7/2010 | Yu | 236/49.3 |
| 2012/0104108 | A1 * | 5/2012 | Westberg et al. | 236/49.3 |
| 2012/0248211 | A1 * | 10/2012 | Warren et al. | 236/1 |

OTHER PUBLICATIONS

Littelfuse Protection Relays & Controls, "Time Delay Relays", 2016, Littelfuse Protection Relays & Controls, US.
ICM Controls, "On Delay/Off Delay Controls Circulating Fan in HVACR System",Oct. 2, 2007 , ICM Controls, US.

(Continued)

*Primary Examiner* — Joseph A Kaufman
(74) *Attorney, Agent, or Firm* — Averill & Green; Kenneth L. Green

(57) ABSTRACT

A programmable controller circuit that can be connected directly to the fan switch of any thermostat with a forced air heating and/or cooling system that includes a blower fan for circulating air throughout the home. The controller can be installed with minimal modifications to the existing wiring. The present invention increases the efficiency of the cooling system by evaporating condensate and extracting residual coolness from the thermal mass of the evaporator coils. The present invention can be programmed with a single button. A method of adapting additional fan run time based on [compressor run time] *an AC compressor off time and an AC compressor on time.*

16 Claims, 6 Drawing Sheets

*Amended*

(56) References Cited

OTHER PUBLICATIONS

Proctor Engineering Group, Ltd., "Energy Performance of Hot, Dry Optimized Air-conditioning Systems", Jul. 2008, California Energy Commission, California, US.
Proctor Engineering Group, Ltd., Hot Dry Climate Air Conditioner Pilot Field Test, Mar. 2, 2007, Pacific Gas & Electric, US.
Proctor Engineering Group, Ltd., "Hot Dry Climate Air Conditioner Pilot Field Test Phase II", Feb. 8, 2008, Pacific Gas & Electric, US.
Conant A., "Field Tests of Specially Selected Air Conditioners for Hot Dry Climates", Aug. 17, 2008, Pacific Gas and Electric Company, US.
Proctor Engineering Group, Ltd., "Concept 3™ Furnace Fan Motor Upgrade", Oct. 1, 2009, California, US.
Khattar, M., "Another Aspect of Duty Cycling: Effects on Indoor Humidity", Jan. 1987, American Society of Heating Refrigerating and Air-Conditioning Engineers, US.
Henderson, H., "Understanding The Dehumidification Performance of Air-Conditioner Equipment at Part-Load Conditions, Final Report", Jan. 2006, Florida Solar Energy Center Florida, US.
Proctor Engineering Group Ltd., California Air Conditioner Upgrade—Enhanced Time Delay Relay—Residential, Work Paper WPPEGPGE0001, Date: May 18, 2008, p. 15, Proctor Engineering Group Ltd., 65 Mitchell Blvd. Suite 201, San Rafael, CA 94903, USA.
Proctor, J. Fan Controller for Extracting Evaporative Cooling from an Air Conditioning System, Date: Feb. 4, 2008, pp. 2, Electronic Filing Receipt for U.S. Appl. No. 61/026,058, John Proctor, 415 Mission Ave., San Rafael CA 94901, USA.
Proctor Engineering Group Ltd., Workpaper Extended Fan Time Delay Relay, Date: Feb. 9, 2007, pp. 7, Proctor Engineering Group Ltd., 418 Mission Ave., San Rafael, CA 94901 USA.
Proctor Engineering Group Ltd., CheckMe!® Concept 3—Brush Free DC by McMillan Installation Instructions, Date: Dec. 31, 2008, pp. 7, Published by Proctor Engineering Group Ltd., 418 Mission Ave., San Rafael, CA 94901 USA.
Energy Federation Inc., Promo—Concept 3 High Efficiency Motor, Date: Jan. 21, 2009, pp. 3, Energy Federation Inc., 40 Washington St, Westborough, MA 01581 USA.
Proctor Engineering Group Ltd., Promo—Concept 3 PEG Calif-Photo, Date: Dec. 31, 2008, p. 1, Proctor Engineering Group Ltd., 418 Mission Ave., San Rafael, CA 94901, USA.
Proctor Engineering Group Ltd., Enhanced Time Delay Relay Installation Procedure, Date: Nov. 28, 2006, pp. 2, Proctor Engineering Group Ltd., 418 Mission Ave., San Rafael, CA 94901, USA.
Proctor Engineering Group Ltd., Air Conditioner Enhanced Time Delay Relay (DelayRelayFactSheet 3-LR.pdf), Dated: Dec. 31, 2007, pp. 2, Proctor Engineering Group Ltd., 418 Mission Ave., San Rafael, CA 94901, USA.

* cited by examiner

211

*Amended*

*Amended*

*AMENDED*
Figure 5
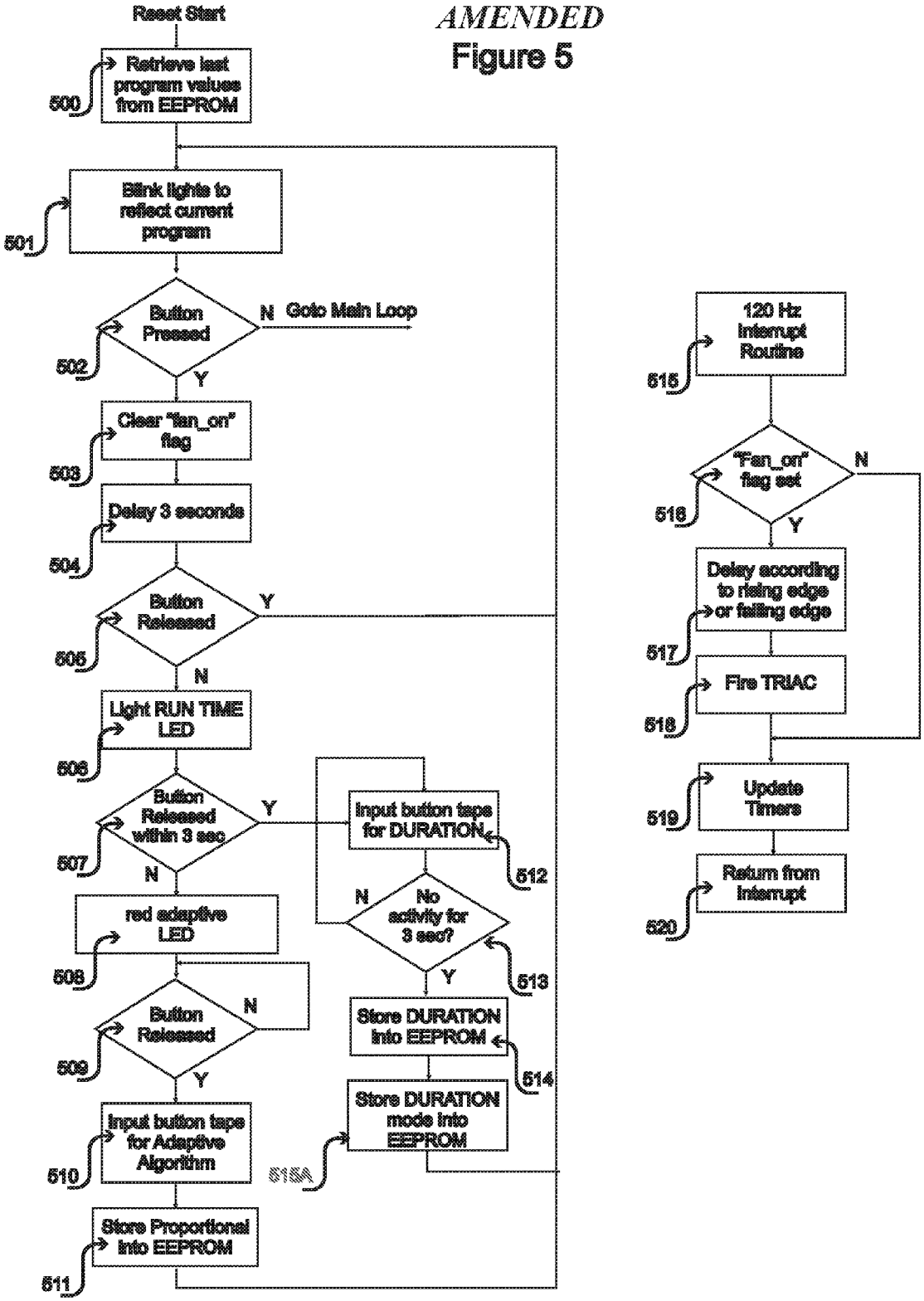

*Amended*
Figure 6
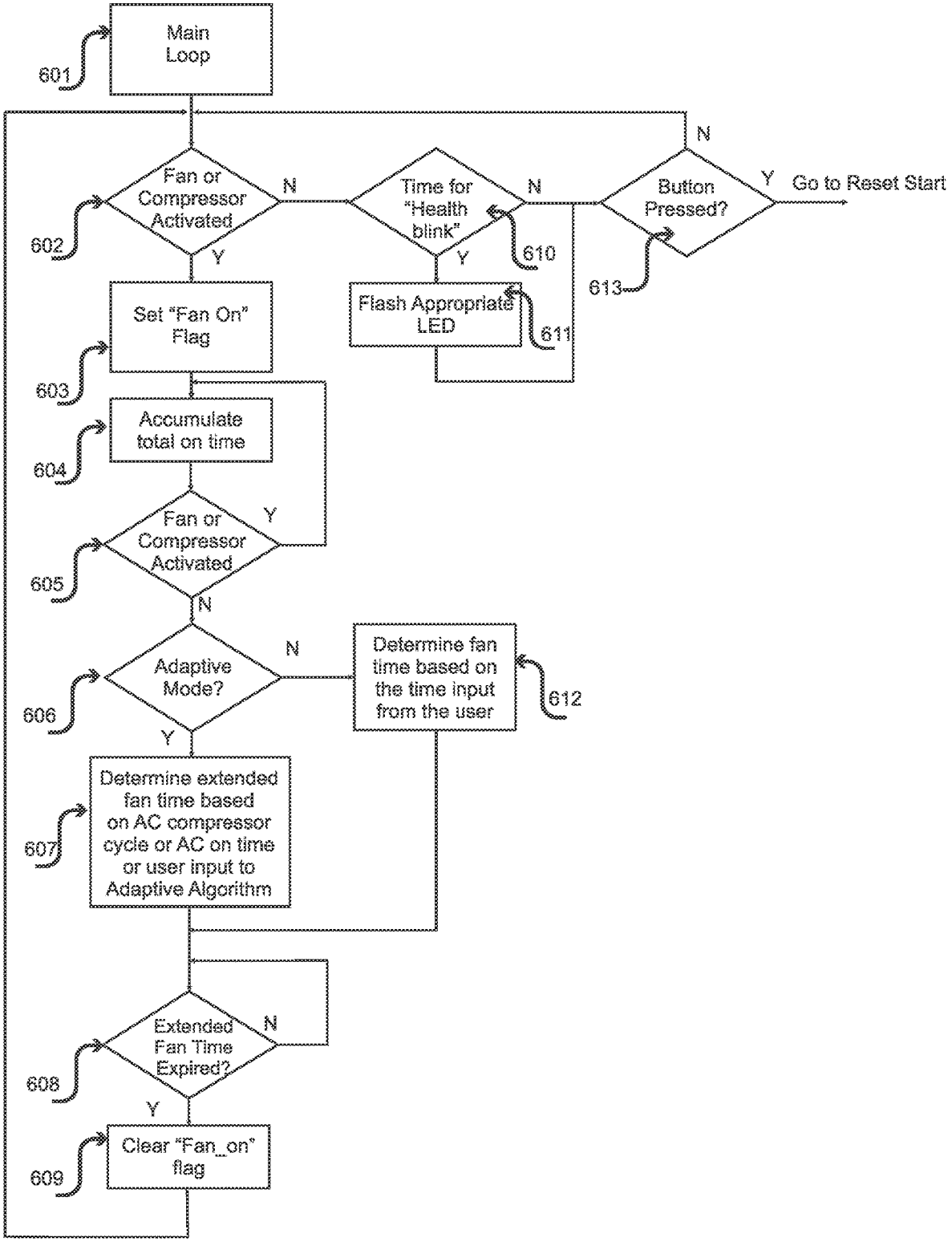

EXTERNAL THERMOSTAT FAN CONTROLLER

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

This application claims the benefit of provisional patent application Ser. No. 61/324,229 filed 2010 Apr. 14 by the present inventor.

FEDERALLY SPONSORED RESEARCH

Not applicable.

SEQUENCE LISTING OR PROGRAM

Not applicable.

BACKGROUND OF THE INVENTION

1. Field of the Invention

This invention is a device for extending the run time of an air conditioning fan after the compressor stops and thereby increasing the cooling/heating output and in the case of air conditioning, increasing the Sensible Energy Efficiency Ratio (SEER).

2. Description of the Related Art

U.S. Pat. No. 5,142,880 (Bellis, 1992) discloses a solid state control circuit for use in connection with existing low-voltage thermostat terminals of a central, forced-air, air conditioning system having a compressor and an indoor blower and gas-fired or electrical heating elements. The '880 patent relates generally to systems for increasing the efficiency of air conditioning units by continuing the blower running time after the compressor is turned off. Specifically, the '880 patent claims an air conditioning control unit comprising a low voltage room thermostat fan terminal, a low voltage compressor relay terminal, a timing circuit means, a sensitive gate triac, and a power triac. The '880 patent also claims a method for controlling the on-off time of an indoor fan that is controlled by and associated with an indoor thermostat for a room air conditioning system. The apparatus of the '880 patent is not programmable or adaptable. It does not have a fixed delay from one system to another. The delay is related to the supply voltage, which varies from system to system. Bellis provides constant current to the triac gates on the order of 6 milliamps. The total current draw is even higher than that when all components are included. Many systems have do not accommodate this much current draw through control relays without causing a humming noise which irritates the user. The Bellis design momentarily de-energizes the relay when switch from thermostat driven fan to his delay. This can cause relay chatter and excessive wear. Bellis does not provide for an override function if the unit fails. The Bellis design is a "fixed" delay. The delay does vary with respect to supply voltage, component variation and temperature. Bellis outlines between 3 and 5 minutes for the delay. His device is not programmable or adaptable.

In U.S. Pat. No. 5,882,233 Noto teaches of a device used to extend the fan run time and also periodically activate the fan during times the system is not calling for heating or cooling. Noto requires the circuit to have access to the 24 VAC signals from the AC transformer. This requirement precludes his device from being connected directly to the thermostat since most thermostats do not have both the hot and neutral legs of the transformer. Household wiring only provides the hot (red) signal to the transformer. Although Noto teaches of a range of delays, his invention uses fixed values for the delays. The delays in his invention are not programmable either by a user interface or by system conditions such as the duration of the compressor activation.

U.S. Pat. No. 4,842,044 (Flanders et al., 1989) provides a heating and cooling control system that works by energizing a fan or other fluid circulating device to circulate fluid and effect thermal transfer of energy from the fluid to the spaces being heated and by deenergizing the circulating means at a selected time interval after deenergization of the heating and control system. The '044 patent also claims a heating control system comprising a switching means to effect energization of the fluid circulating means, a switching control means that is energizable in response to operation of the control circuit, and an additional circuit means that energizes the switching control means a selected time interval after deenergization of the heating system. '044 patent is intended to increase the time the fan is turned on after a heating cycle to improve energy efficiency. Unfortunately, it draws power continuously from the gas solenoid through a 680 ohm resistor, and this method has proven to be problematic in practice. Too much current drawn in this way, can cause a humming noise in the gas valve and even false operation. The patented device also enables the fan relay to activate the blower as soon as the gas valve is activated. This results in cool air being circulated throughout the home since the plenum is not sufficiently warm. Normal heat operation retards the blower until the temperature in the plenum reaches a preset operating temperature. The '044 patent also requires the addition of a relay circuit. This relay must be active the entire time the fan is to be off, creating a significant current draw even when the system is in not calling for heating or cooling. The '044 patent also describes fixed delays. It has no way to adapt the fan delay times either by user input or by the compressor run time. The delays provided by the '044 patent are also subject to the variations of the components selected. Additionally, although Flanders touches on the subject of how his invention works when the fan switch on the thermostat is moved from the AUTO position to the ON position, as described, there is no way for the fan to come on when the homeowner requests.

In U.S. Pat. No. 4,136,703, Kinsey teaches of a device that intervenes with the controls coming from a thermostat and going to the heating/cooling system. His invention places a fixed upper limit to the time that the compressor or heating source can be activated and then his invention adds additional time to the blower fan. This activity can increase the efficiency of an air conditioner system by allowing a certain amount of water to condense on the evaporator coil and then re-evaporating this water to cool the home. The amount of water collected will vary based on the humidity of the ambient air. Having a fixed compressor run time with a fixed blower time can create a less efficient system than the current invention. In many environments, limiting the compressor run time and counting on evaporative cooling to reduce the home's temperature will increase the time required to cool the home. In many cases, the desired set point may never be achieved.

In U.S. Pat. No. 7,240,851 Walsh teaches of a furnace fan timer. His device is strictly a timer with a user programmable interval and duration. His device runs continuously in a never ending loop counting down minutes before operating the fan and then counting the minutes to keep the fan activated. Walsh's device is not compatible with air conditioner systems. Most thermostats connect the fan switch to the air conditioner compressor switch when operating in the automatic fan mode. In systems with air conditioners, Walsh's invention will activate the air conditioner compressor when it turns on the fan. This requires users to turn off the circuit breakers for their air conditioner systems when using his device. Walsh's invention has two interchangeable wire connections. The present invention has at least three wires and each connects to a specific location on the thermostat.

The main objects of the present invention are:

(1) to provide a thermostat fan extended time delay device that does not require any special power connection; and (2) to minimize any wiring modifications to accommodate the device; and (3) to adapt the extended time delay based on the length the thermostat called for compressor or fan switch operation as well as user selectable parameters; and (4) to adjust the extended time delay based on user selected parameters.

BRIEF SUMMARY OF THE INVENTION

The majority of this discussion deals with the most complicated controlling mode of air conditioning. The present invention covers an external thermostat fan controller that comprises a microprocessor, an AC/DC converter, zero crossing detector, a switching device, and a user interface, and that connects directly to an existing thermostat with minimal need for rewiring. The invention also encompasses a unique and novel way of deriving power for the device's microprocessor that does not rely on an external power source. The controller of the present invention can operate with a minimum of three leads which can be connected directly to the wiring presented to the standard household thermostat, and a user can program the duration of the extended time delay for the fan, or the device itself can determine the amount of the extended time delay for the fan based on the run time of the compressor or fan switch. In the preferred embodiment, all delay calculations are either done autonomously using an algorithm based on compressor/fan run time, or done with a single button.

The controller according to the present invention causes an extension in the fan run time to increase the efficiency of air conditioning units in hot and dry climates. In most air conditioning systems, the fan is turned off simultaneously with the compressor. This wastes two kinds of cooling still available. The mass of the cooling evaporator is still very cold then the compressor turns off. Running the fan after the compressor stops allows this cooling to be captured and delivered into the home. The second type of cooling available is using the moisture that has condensed on the evaporator coils. By running the fan after the compressor has stopped, the moisture is evaporated and the system functions as an evaporative cooler, commonly known as a swamp cooler. This evaporation cooling is only applicable in hot and dry climates. It would not work as well in areas with high humidity. Studies have been done showing a 10-17% rise in an air conditioning system EER using an extended time delay on the fan. Many new air conditioning systems incorporate a fixed delay directly into their new products. The present invention allows this modern feature to be applied to the installed air conditioner base in hot and dry environments. The user interface can be any form that fits the function, including, but not limited to, an LCD display and keypad, jumpers on the circuit board, or two LEDs and a switch. The switching device can be any device that serves the requisite function; in the preferred embodiment, it is a triac. If the switching means is an electro-mechanical switch, then the invention further comprises a battery to power the microprocessor when the switch is closed.

When the thermostat is selected to heating mode, the controller according to the present invention adds more time to the fan run time, either a fixed amount, or the amount the user programs via the user interface.

The present invention includes a method of extending the cooling system or heating system fan run time using the thermostat fan controller of the present invention.

In accordance with one aspect of the invention, a 60 Hz electrical signal is employed as a time base and therefore has precise timing and does not vary from system to system or by aging or temperature of the components.

In accordance with another aspect of the invention, a controller selectively gates a triac for milliseconds and in doing so, has a total current draw on the order of 100 microamps. This is a current draw improvement of 800% compared to known systems.

In accordance with still another aspect, the present invention controls the fan relay through the entire cycle without interruption, preventing relay chatter and excessive wear.

In accordance with yet another aspect, the present invention restores all connections to their original states when turned off providing an override function if the unit fails.

In accordance with another aspect, the current invention supports not only a precisely fixed delay, but an adaptable delay based on compressor "on" time and it also supports a programmable delay where the user can input the total number of minutes to delay.

In accordance with still another aspect, the present invention does not require the neutral leg of the AC transformer and can therefore be attached directly to the signals present at the thermostat. The present invention employs an innovative method of powering itself using the hot line and the control lines from the thermostat.

In accordance with yet another aspect, the present invention draws very little power when the heating/cooling system is not active since there is no relay to be controlled.

In accordance with another aspect, the present invention works regardless of the fan switch position in "ON" or "AUTO" position.

In accordance with yet another aspect, the present invention does not limit the amount of time the compressor operates and thus maintains system efficiency. The present invention relies on the thermostat to determine when the desired set point has been reached, and only then does it extend the fan run time. This ensures the homeowner's comfort and provides for the efficiency gains at the end of the cycle. The present invention also can be mounted directly at the thermostat whereas known systems require constant 24 VAC power for the use of switching relays.

In accordance with still another aspect, the present invention does nothing until the thermostat calls for heating or cooling. Once the thermostat calls for cooling or heating, the present invention can extend the fan run time for either a fixed duration or an adaptable duration based on the time the compressor was active.

In accordance with yet another aspect, the present invention is designed specifically to work with systems containing both heating and air conditioning. Known systems requires a user interface to enter the duration and interval. Once entered, the fan run time is not variable. The present invention may contain a user interface, but does not require one. It measures the amount of time the compressor was active and determines the fan run time automatically. The present invention interrupts the signal from the thermostat to the fan relay and overrides the fan control.

BRIEF DESCRIPTION OF THE DRAWINGS

FIGS. 5 and 6 illustrate, in block diagram form, the programming of the preferred embodiment of the present invention.

REFERENCE NUMBERS

Figure 1:
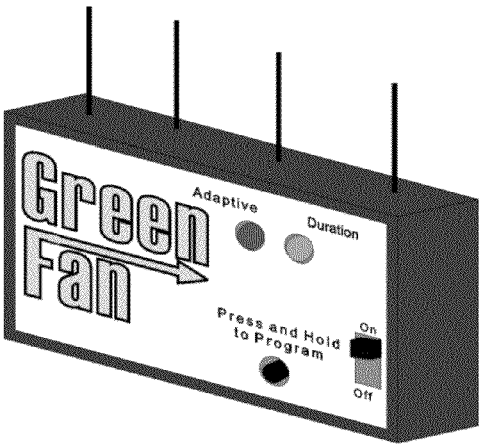
FIG. 1 is a pictorial illustration of the preferred embodiment of the present invention.

201 Existing household thermostat
202 Furnace/heat producing control circuitry
203 Air conditioning compressor control
204 Fan contact terminal
205 Fan/blower relay
206 System fan/blower
207 Air conditioning contact terminal
208 Heater contact terminal
209 Hot contact terminal
210 System 24 VAC transformer
211 External thermostat fan controller
212 Fan relay lead
213 Transformer Hot lead
214 Thermostat fan activation switch lead
215 [N/A] *Optional lead to thermostat A/C compressor terminal 207.*
216 Optional lead to thermostat heat terminal
217 Break in wiring from thermostat to fan relay
301 Switching device
302 Zero crossing detector
303 AC/DC converter
304 Microprocessor
305 User interface
306 Optional battery
307A On/Off Switch in "ON" position
307B On/Off Switch in "OFF" position
500-520 Flow diagram blocks
601-613 Flow diagram blocks

DETAILED DESCRIPTION OF INVENTION

FIG. 1 is a pictorial illustration of a fan controller 211 according to the present invention. The fan controller 211 can connect directly to an existing thermostat through the use of only three wires. It can be mounted on the wall near the thermostat or located anywhere else in the house, as long as it can be connected to the thermostat wires.

Figure 2:
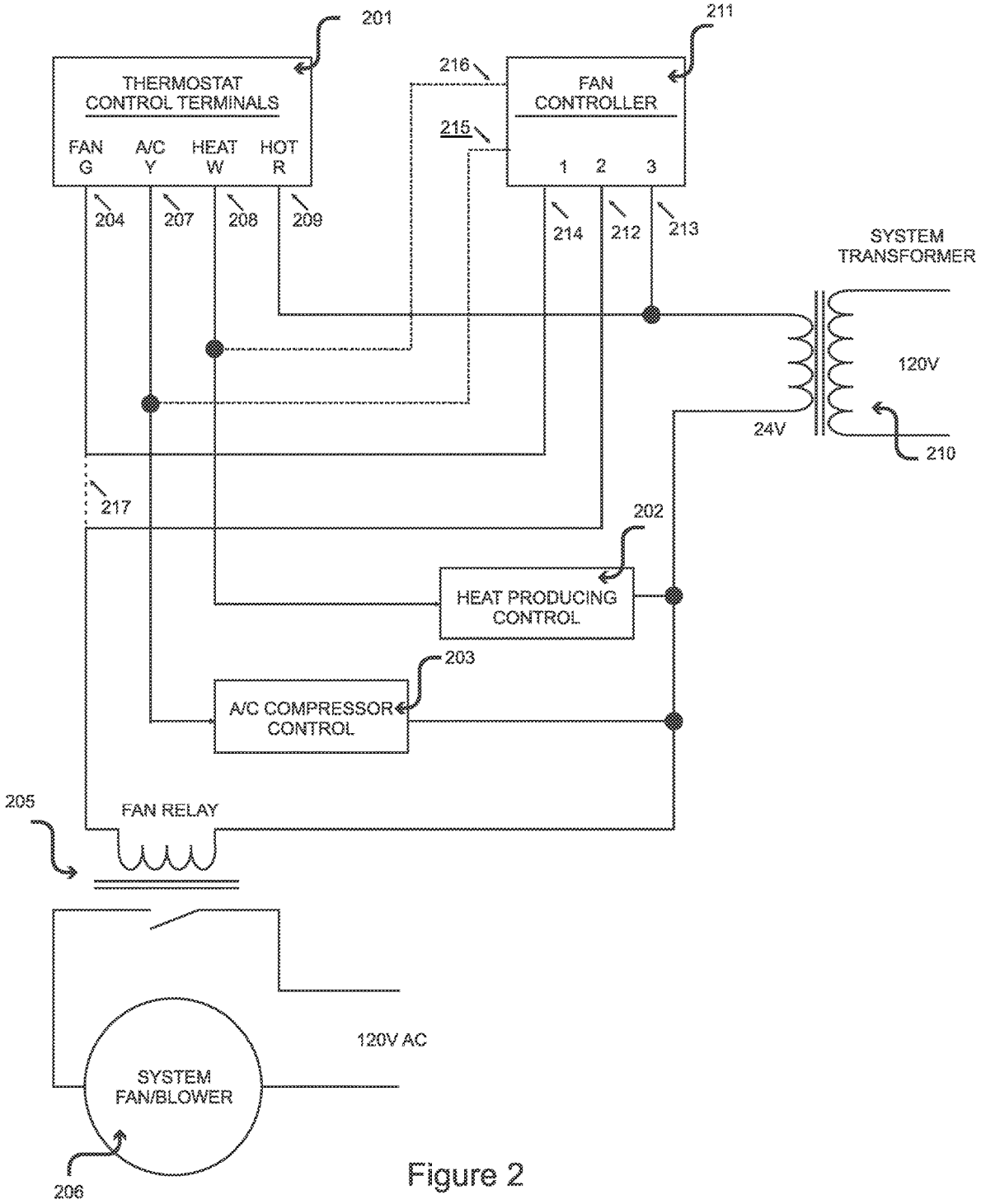
FIG. 2 illustrates, in block diagram form, the configuration of the present invention in relation to an existing household thermostat.

FIG. 2 illustrates, in block diagram form, the configuration of the present invention in relation to an existing household thermostat 201. The thermostat 201 is typically connected as shown when the home has a furnace/heat producing control circuitry 202 and air conditioning compressor control 203. Prior to the installation of the present invention, the fan contact terminal 204 connects the thermostat 201 to the fan/blower relay 205. With the addition of the fan controller 211, this connection is interrupted as shown by dashed line 217 and the terminal 204 is connected to terminal 214 of the fan controller 211 and terminal 212 of the fan controller 211 is connected to the fan relay 205. When actuated, the fan relay 205 connects the system fan/blower 206 to the 120 VAC. The air conditioning (*A/C*) contact terminal (*A/C Y*) 207 connects the thermostat 201 to the air conditioning compressor control 203. *215 and 216 show a connection from the thermostat terminal blocks 207 and 208.* The heater contact terminal 208 connects the thermostat 201 to the heat producing control circuitry 202. The hot terminal 209 connects the thermostat 201 to the hot side of the 24 volt AC transformer 210.

Optional lead 216 shows a connection from the heater contact terminal 208 of the thermostat 201 to the fan controller 211. This wiring path is optional when the fan controller 211 is used in a system where the heat fan time is extended. In the preferred embodiment no additional power connections are required, unlike some prior art, which requires either a dedicated connection to the transformer or another relay. The fan controller 211 draws power through the fan/blower relay 205. This lack of external power is new and innovative as compared to prior art.

Figure 3:
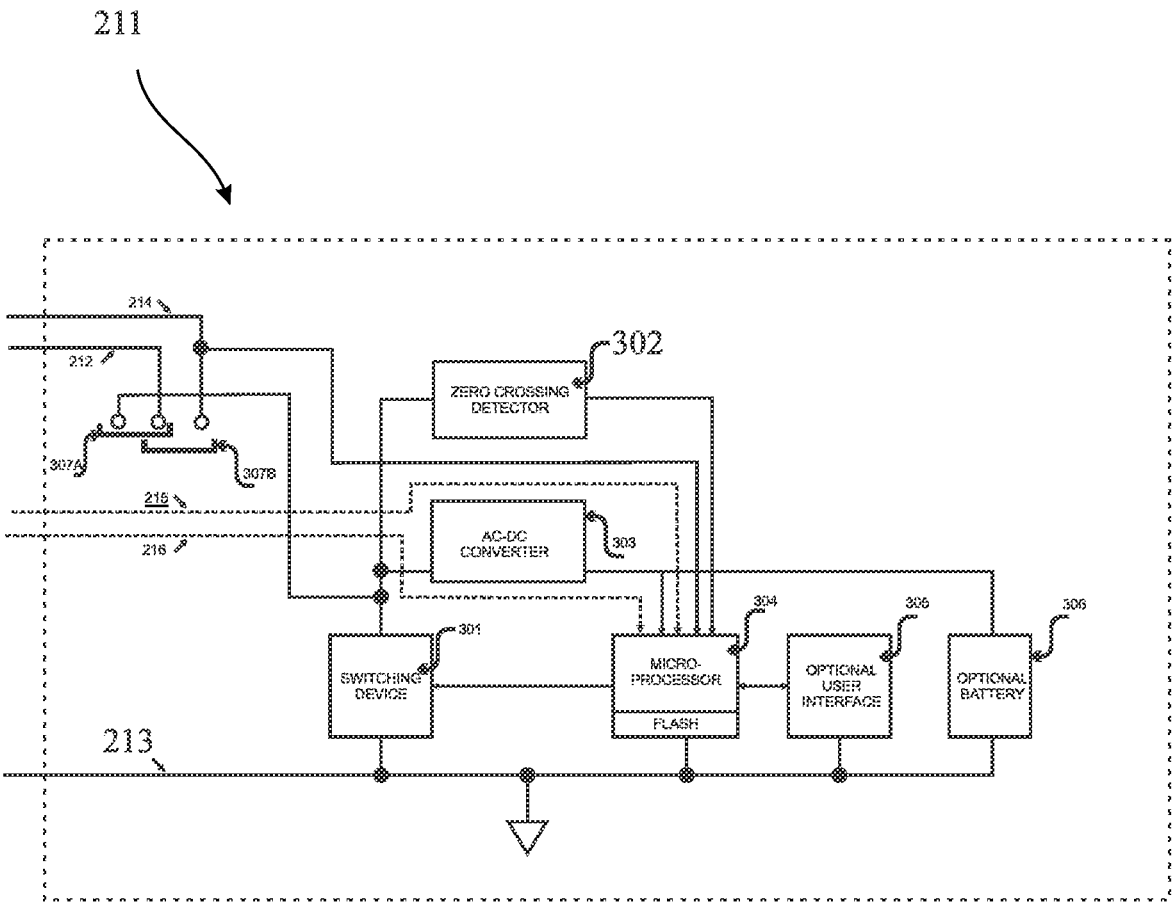
FIG. 3 illustrates, in block diagram format, the components of the present invention.

FIG. 3 illustrates, in block diagram format, the components of the fan controller 211. A microprocessor 304 is used to control a switching device 301, receive input and provide output to a user interface 305. The microprocessor 304 receives power from an AC/DC converter 303 and also receives input from a zero crossing detector 302, the line from a transformer hot lead terminal 213 electrically connected to the hot contact terminal 209 of the transformer 201, and optionally the input that enables the NC compressor. The microprocessor 304 performs several major functions. In terms of timing, the microprocessor 304 keeps track of seconds and minutes by monitoring the AC line signal. Each positive zero crossing accounts for $1/60_{th}$ of a second; therefore, sixty positive crossings occur each second. The seconds are then accumulated to keep track of minutes. The negative crossings are also monitored to provide timing for a switching device 301. The switching device 301 could be either a standard relay type device, a reed relay or some other electromechanical device. It could also be a solid state device such as an FET switch or a triac. Each switching device requires minor modifications to the baseline design, but each manifestation of the switching device is covered by the present invention. The description of the preferred embodiment is based on a triac switch, but the present invention is not limited by the type of switching device. In the event the switching device 301 is a triac, it must be triggered at each positive and negative zero crossing of the AC line.

The user interface 305 comprises an input device to the microprocessor 304 and visual outputs to the user that enable the programming of the fan delay timing and methods. The microprocessor 304 continuously monitors the user interface 305 to determine if there is any change to the current system operation. If a change is requested by the user, the current programming of the switch state is set to neutral (the switching device 301 is turned off) and the user interface 305 is monitored to determine the user's requested action. In the preferred embodiment, the microprocessor contains an EEPROM, which allows the unit to store the user's programming instructions when there is no power applied to the unit.

The AC/DC converter 303 is used to condition the input 24 VAC signal into a DC signal necessary to operate the DC devices within the unit. The zero crossing detector 302 is used to condition the AC input to a level that will not damage the microprocessor 304. The microprocessor 304 generates an interrupt in both the positive going and negative going zero crossings and uses this zero crossing timing to keep track of elapsed time and also to determine when to fire the triac, which may be used as the switching device 301. While the description of the preferred embodiment is based on a triac switch, the present invention is not limited by the type of switching device and the switching device 301 may be a standard relay, a reed relay or some other electro-mechanical device, or a solid state device such as an FET switch.

There are four operating modes, each with different user interfaces, that are manifested in the single product and circuit board. The first, mode 1, is a fixed fan timing extension. It could be anywhere from 2 minutes to mode than 10 minutes, but whatever it is, it is fixed and constant. Mode 1 requires no special user interface, neither buttons nor LED indicators. The timing delay can be set using jumpers or switches manufactured into the circuit board.

The second mode, mode 2, is an adaptive mode. The processor 304 monitors the duration the fan or compressor is activated by the thermostat 201, and it adjusts the delay accordingly. If the compressor is run for a short period of time and there is not much condensation on the evaporator, the fan time will be extended for a shorter period of time. Likewise, if the compressor has run for a longer period of time, allowing for more condensate, the fan will run for a longer period of time after the compressor has stopped. There is nothing to preclude the adjustment of the algorithm to support a variety of operating parameters. If it turns out in the future that the timing table needs to be reversed, that would be an obvious extension of the capabilities of the present invention. Mode 2 requires no special user interface, neither buttons nor LED indicators.

Mode 3, is a programmable mode. In the preferred embodiment, the user interface 305 would be compromised of a single switch and a single LED. The user simply inputs the number of minutes to run the fan after the compressor stops by tapping the button while the fan controller 211 is listening for input. This user interface is not intended to preclude the use of switches or other ways of programming the fan time extension.

Mode 4, is a combination of mode 2 and mode 3. Mode 4 allows the user to select whether to operate in adaptive mode as in mode 2 or the user may input a number of minutes to run the fan. When mode 4 is set to the adaptive method, the user can input additional parameters to the adaptive algorithm so fine tuning can occur. These additional parameters are input using the same single push button but a different color of LED indicator. This could be a completely different LED or a single LED capable of multiple colors. FIG. 6 is a detailed flow chart of the interaction between the LEDs and the switch when operating in mode 4.

The preferred embodiment of the present invention using a triac does not require a battery. The fan controller 211 draws its power through the 24 VAC transformer 210 (see FIG. 2). In the event that an electro-mechanical switch was used, either an optional battery would be added to power the microprocessor 304 or the additional lines 215 and 216 could provide power when the switch is closed.

Figure 4:
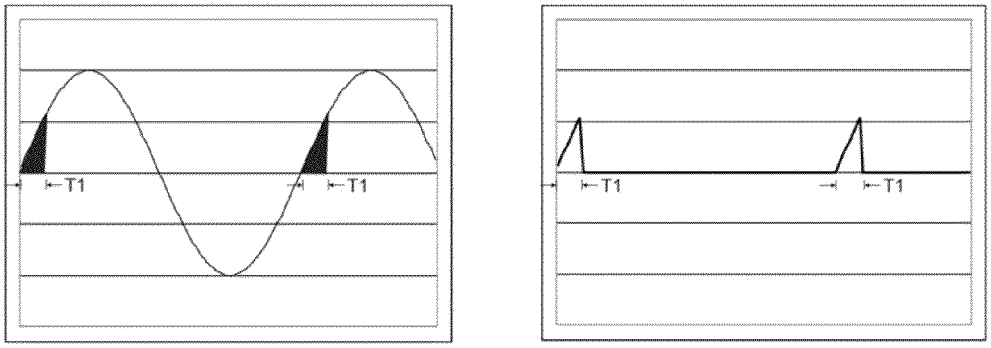
FIG. 4 is a graph illustrating the timing associated with powering the present invention.

FIG. 4 shows graphs that illustrate the timing associated with powering the present invention. Because power is drawn through the fan/blower relay 205 (see FIG. 2), when the fan/blower relay is not actuated, 24 VAC is applied to the terminals of the fan controller 211. That power is sufficient to drive the fan controller 211 and all its components. Normally, to actuate the fan relay, the fan switch must appear closed, in other words, in FIG. 2, the fan contact terminal 204 must be shorted to the hot contact terminal 209. This situation creates a problem for anything that is trying to draw power from these terminals because they are now shorted and there is no power available.

The present invention uses an innovative way to draw power. In the preferred embodiment of the invention, using a triac as the switching device 301, the microprocessor does not enable the triac at exactly the zero crossing of the 24 VAC signal. Instead, it delays an amount of time into the positive going cycle and allows the positive going waveform to provide a small amount of charge into the AC/DC circuitry. This charge is represented by the dark areas in FIG. 4A. After a small charge has been accumulated, the microprocessor 304 enables the triac to pass the remainder of the power through to the fan relay 205. This occurrence is represented by FIG. 4B. These figures show the AC waveform rising for a short period and then completely shorted out for the duration of the cycle, which passes this energy on to the fan relay 205 and thus actuates it. In this way, the fan relay 205 gets the majority of the AC waveform and actuates, while enough charge is stored by the AC/DC circuitry to keep the microprocessor 304 running until the next positive going cycle of the AC waveform.

In another embodiment of the present invention, a battery 306 could be used to supply power to the microprocessor 304 when the fan controller 211 is actuating the fan/blower relay 205. In this situation, the 24 VAC signal would be passed to the fan/blower relay 205. This method is less complex but increases the cost of the invention and adds an item (the battery) that requires maintenance and periodic replacement.

FIG. 5 illustrates, in block diagram format, the programming of the preferred embodiment of the present invention. The programming is for mode 4 of the invention, the most complicated. All other modes are a subset of mode 4 and can be easily achieved by eliminating steps. The routine begins at a hardware reset and then proceeds to the first block 500. The interrupt routine begins at block 515. Block 500 indicates that when power is first applied to the present invention, the last stored operating mode and minutes to delay are retrieved from the non-volatile storage, and the present invention is initialized to the last programmed state. Block 501 indicates that the invention will blink the LEDs to visually indicate the last programmed state. If the device was last in a user selected delay mode, the green LED will blink to indicate the number of minutes the user last entered as a delay. If the device was last in an adaptive mode, the unit will blink the red LED to reflect the parameters entered into the adaptive algorithm.

Decision block 502 is used to determine if the user would like to enter device information, or just go to the main loop. If decision block 502 determines that there is a button pressed, then the routine proceeds to block 503 and immediately clears the fan on flag, which causes the fan to be turned off at the next interrupt. The present invention then delays for three seconds as indicated in block 504. The button is again tested as shown in decision block 505. If the button was released before the three seconds are up, then the programming loop is aborted, and the unit restarts at block 501.

If the button was held down for at least three seconds as indicated in decision block 505, it is clear that the user wishes to change the programming. The green "Duration" LED is illuminated shown in block 506, which indicates to the user that the invention is ready to accept button taps as programming input for the run time delay. Once the green "Duration" LED is illuminated, the unit begins another three-second internal controller. If the user releases the button within three seconds of seeing the green LED illuminated, as determined in decision block 507, then the routine enters the "Duration" programming mode as shown in blocks 512 through 514.

Block 512 indicates that the user now taps the programming button from 0 to 96 times, which internally is interpreted as the number of one minute periods that the present invention will elongate the fan operation. In other words, if the user taps the button four times, the present invention will keep the fan active for four minutes after the compressor has stopped. Block 514 indicates that after the user has tapped in the number of one minute periods of fan time extension and released the button for three seconds, the invention stores the new program into the non-volatile storage as indicated in block 514 and then restarts from the beginning at block 501. If the user enters the programming mode and at any step does not enter any button taps, the present invention will revert to the last number of taps that was stored in the non-volatile memory for the duration.

In addition to the function described above, block 507 also determines if the button was not released within three seconds of when the green "Duration" LED was illuminated. Continuing to depress the programming button after the green "Duration" LED was illuminated indicates to the present invention that the user wishes to skip the duration programming and proceed to program the adaptive algorithm parameters. The present invention indicates that it is ready to accept adaptive algorithm parameters by extinguishing the green "Duration" LED and illuminating the red "Adaptive" LED. This is indicated in block 508 and is the signal to the user that adaptive algorithm parameters are ready to be programmed. This programmability allows multiple inputs to the adaptive algorithm such as a multiplier to the baseline adaptive delay.

At decision block 509, the present invention waits for the user to release the programming button. Block 510 is used to count the number of taps the user enters for the adaptive algorithm parameters. For instance, there can be four pre-set adaptive algorithm parameters, and the user taps the button once, twice, three or four times to indicate which setting would be optimal for the current cooling configuration. Block 511 stores the new adaptive algorithm parameters into the non-volatile memory, and the unit restarts from the start at block 501.

Block 515 indicates the beginning of an interrupt routine. This routine is entered at the rising and falling zero crossings of the 24 VAC signal. The interrupt routine first determines if the fan is scheduled to be on in decision block 516. If not, the routine merely updates internal controllers 519 by counting the number of 60 Hz transitions on the 24 VAC power input line.

After delaying the amount of time into the interrupt cycle based on rising or falling edge as shown in block 517, block 518 fires the triac, and the remainder of the 24 VAC signal is passed on to the fan relay, thus energizing the relay for this 60 Hz cycle. The interrupt routine then follows the actions as described above by updating the internal controllers, block 519. Block 520 returns from the interrupt to the calling routine.

FIG. 6 illustrates the main loop of the preferred embodiment. Block 601 is the start of the main loop. Block 602 is used to determine if the fan or compressor is activated by the thermostat. If neither are activated, the routine uses block 610 to determine if it is time to blink either the red or green led to indicate the unit is on and in a healthy state as shown in block 611. The unit then looks to see if the button was pressed. If so, it is an indication that the user would like to change some of the parameters and the unit restarts itself and prepares to input button presses. If block 602 determines that the thermostat is calling for the fan to be activated, block 603 sets the "fan on" flag. This flag is a indicator to the interrupt routine that the switching device 301 should be activated on the next rising edge of the 60 Hz signal. The routine then accumulates the total time the thermostat is calling for the fan to be active as shown in block 604. This is accumulated value is input to the adaptive algorithm to automatically determine the extended fan run time based on the time the thermostat called for the fan to be on.

Decision block 605 simply looks to see it the thermostat is calling for the fan to be activated, either through the fan switch, or the optional connection to the thermostat cooling contact 207. If the fan is still active, simply accumulate more time. Decision block 606 determines if the invention is in adaptive mode or programmable mode. If in programmable mode, block 612 looks up the number of minutes the user entered and drops into a loop to keep the fan on for that number of minutes. If the invention is in adaptive mode, the total time the fan was activated by the thermostat and the user input parameters are entered into an algorithm to determine the duration to keep the fan on. A simple algorithm, block 607, could take the form of a look up table as shown in Table 1 below:

TABLE 1

Fan run time extension based on user selectable parameters

| Thermostat Fan on time | User parameter 1 | User parameter 2 | User parameter 3 | User parameter 4 |
|---|---|---|---|---|
| 0-5 min | 1.5 | 2 | 2.5 | 3 |
| 5-10 min | 3 | 4 | 5 | 6 |
| 10-15 min | 4.5 | 6 | 7.5 | 9 |
| 15 min+ | 6 | 8 | 10 | 12 |

Although the preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

DEFINITIONS

The term "AC/DC" means Alternating Current/Direct Current.

The term "FET" means Field-Effect Transistor.

The term "Hz" means "hertz" or a unit of frequency equal to one cycle per second.

The term "LCD" means Liquid Crystal Display.

The term "LED" means Light Emitting Diode.

The term "triac" means a three-terminal semiconductor for controlling current in either direction.

The term "VAC" means Volts, Alternating Current.

I claim:

1. A method for connecting an external fan controller (211) to an existing Air Conditioning (AC) system including a system fan (206), and controlling the fan by the external fan controller, the method comprising:

positioning the external fan controller;

disconnecting a fan relay lead (217) originally connecting a thermostat fan "G" terminal (204) to a fan relay (205) controlling the fan, from the thermostat fan "G" terminal (204);

reconnecting the fan relay lead to a fan activation switch output terminal (212) of the external fan controller;

connecting the thermostat fan "G" terminal to a fan terminal input (214) on the external fan controller;

*connecting an A/C compressor terminal (207) of the thermostat to an AC compressor input (215) of the external fan controller (211);* leaving an original AC compressor lead in place between an AC compressor terminal of the thermostat and an AC compressor; and leaving a power signal lead in place between a transformer and the thermostat;

connecting a power signal lead from a system transformer (210) to a low-voltage input (213) of the fan controller (211); and the external fan controller controlling a run time of the fan, comprising the steps of:

monitoring a duration of each AC compressor cycle;

determining a variable amount of time a fan operation is extended after each cooling cycle based on the duration of each AC compressor cycle; and extending the fan operation after the end of each cooling cycle for the variable amount of time based on the duration of each AC compressor cycle.

[2. The method of claim 1, wherein the external fan controller does not include a user interface.]

[3. The method of claim 1, further including a step of connecting a sole power signal for the external fan controller in parallel with a hot contact terminal of the thermostat.]

[4. The method of claim 1, further including the external fan controller extending a run time of the fan for a factory programmable fixed duration after an end of a cooling cycle.]

[5. The method of claim 1, wherein the controller extends the fan run time for a user programmable fixed amount after a cooling cycle.]

6. A method for connecting an external fan controller to an existing Air Conditioning (AC) system including a fan, and controlling the fan by the external fan controller, the method comprising:

positioning the external fan controller;

disconnecting a fan relay lead originally connecting a thermostat fan terminal to a fan relay controlling the fan, from the thermostat fan terminal;

reconnecting the fan relay lead to a fan activation switch terminal of the external fan controller;

connecting the thermostat fan terminal to a fan terminal on the external fan controller;

leaving an original AC compressor lead in place between an AC compressor terminal of the thermostat and an AC compressor;

*connecting an A/C compressor terminal of the thermostat to an AC compressor input of the external fan controller;* leaving a power signal lead in place between a transformer and the thermostat; and the external fan controller controlling a fan run time of the fan, comprising the steps of:

monitoring a duration of each AC compressor cycle; and determining a variable amount of time a fan operation is extended after each cooling cycle based on each duration.

[7. The method of claim 1, further including:

monitoring the duration of the air conditioner compressor cycle; and determining an amount of time the fan operation extension based on user selected values after the cooling cycle.]

[8. The method of claim 1, wherein the external fan controller includes a user interface comprising an LCD display and keypad.]

[9. The method of claim 1, wherein the external fan controller includes a user interface comprising at least one LED and one switch.]

[10. The method of claim 1, further including programming the external fan controller using a single button.]

[11. The method of claim 1, further including the external fan controller determining whether it is operating in fixed delay mode or adaptable delay mode, wherein both the fixed and adaptable mode can be programmed with a single button.]

[12. The method of claim 1, wherein the external fan controller includes a triac, and including a step of switching the fan relay on and off by the triac.]

[13. The method of claim 1, wherein the external fan controller includes an electro-mechanical switch, a microprocessor controlling the external fan controller, and a battery to power the microprocessor when the electro-mechanical switch is closed, and including a step of switching the fan relay on and off by the electro-mechanical switch.]

14. A method for connecting an external fan controller to an existing Air Conditioning (AC) system including a fan, and controlling the fan by the external fan controller, the method comprising:

positioning the external fan controller;

disconnecting a fan relay lead originally connecting a thermostat fan terminal to a fan relay controlling a fan, from the fan relay;

reconnecting the fan relay lead to a thermostat fan activation switch terminal of the external fan controller;

connecting a second fan relay lead from a fan relay terminal on the external fan controller to the fan relay;

leaving an original AC compressor lead in place between an AC compressor terminal of the thermostat and an AC compressor;

*connecting an A/C compressor terminal of the thermostat to an AC compressor input of the external fan controller;* leaving a power signal lead in place between a transformer and the thermostat; *and* wherein the external fan controller performs the following actions:

monitoring a duration of each AC compressor cycle;

determining a variable amount of time a fan operation is extended after each cooling cycle based on the duration of each AC compressor cycle; and the external fan controller controlling a fan run time of the fan for the variable amount of time for each AC compressor cycle.

15. A method for connecting an external fan controller to an existing Air Conditioning (AC) system including a fan, and controlling the fan by the external fan controller, the method comprising:

positioning the external fan controller; disconnecting a fan relay lead originally connecting a thermostat fan terminal to a fan relay controlling a fan, from the fan relay;

reconnecting the fan relay lead to a thermostat fan activation switch input terminal of the external fan controller;

connecting a second fan relay lead from a fan relay output terminal on the external fan controller to the fan relay;

leaving an original AC compressor lead in place between an AC compressor terminal of the thermostat and an AC compressor;

*connecting an A/C compressor terminal of the thermostat to an AC compressor input of the external fan controller;* leaving a power signal lead in place between a system transformer and the thermostat;

connecting a sole power signal for the external fan controller in parallel with the power signal lead of the thermostat; and the external fan controller controlling a fan run time of the fan, comprising the steps of:

monitoring a duration of each AC compressor run time;

determining a variable amount of time a fan operation is extended after each AC compressor AC compressor run time based on the duration of each AC compressor run time.

16. The method of claim 1, wherein duration of the AC compressor cycle is at least one duration selected from the group consisting of: an AC on time, and an AC off time.

17. The method of claim 6, wherein duration of each AC compressor cycle is at least one duration selected from the group consisting of: an AC compressor on time, and an AC compressor off time.

18. The method of claim 14, wherein duration of each air conditioner compressor cycle is at least one duration selected from the group consisting of: an AC on time, and an AC off time.

19. The method of claim 1, wherein duration of each AC compressor cycle is an AC compressor on time.

20. The method of claim 6, wherein duration of each AC compressor cycle is an AC compressor on time.

21. The method of claim 14, wherein duration of each AC compressor cycle is an AC compressor on time.

22. The method of claim 1, wherein monitoring the duration of each AC compressor cycle is based on whether or not the fan or AC compressor are activated by the thermostat based on the presence or absence of at least one signal selected from the group consisting of: a fan signal, and an AC compressor signal.

23. The method of claim 6, wherein monitoring the duration of each AC compressor cycle is based on whether or not the fan or AC compressor are activated by the thermostat based on the presence or absence of at least one signal selected from the group consisting of: a fan signal, and an AC compressor signal.

24. The method of claim 14, wherein monitoring the duration of each AC compressor cycle is based on whether or not the fan or AC compressor are activated by the thermostat based on the presence or absence of at least one signal selected from the group consisting of: a fan signal, and an AC compressor signal.

25. The method of claim 1, wherein monitoring the duration of each AC compressor cycle is based on whether or not the fan or AC compressor are activated by the thermostat based on the presence or absence of a thermostat call for cooling.

26. The method of claim 6, wherein monitoring the duration of each AC compressor cycle is based on whether or not the fan or AC compressor are activated by the thermostat based on the presence or absence of a thermostat call for cooling.

27. The method of claim 14, wherein monitoring the duration of each AC compressor cycle is based on whether or not the fan or AC compressor are activated by the thermostat based on the presence or absence of a thermostat call for cooling.

* * * * *